Oct. 7, 1958  I. A. PIROGOW  2,854,750
PERSPECTIVE DRAWING DEVICE
Filed July 15, 1954  7 Sheets-Sheet 1
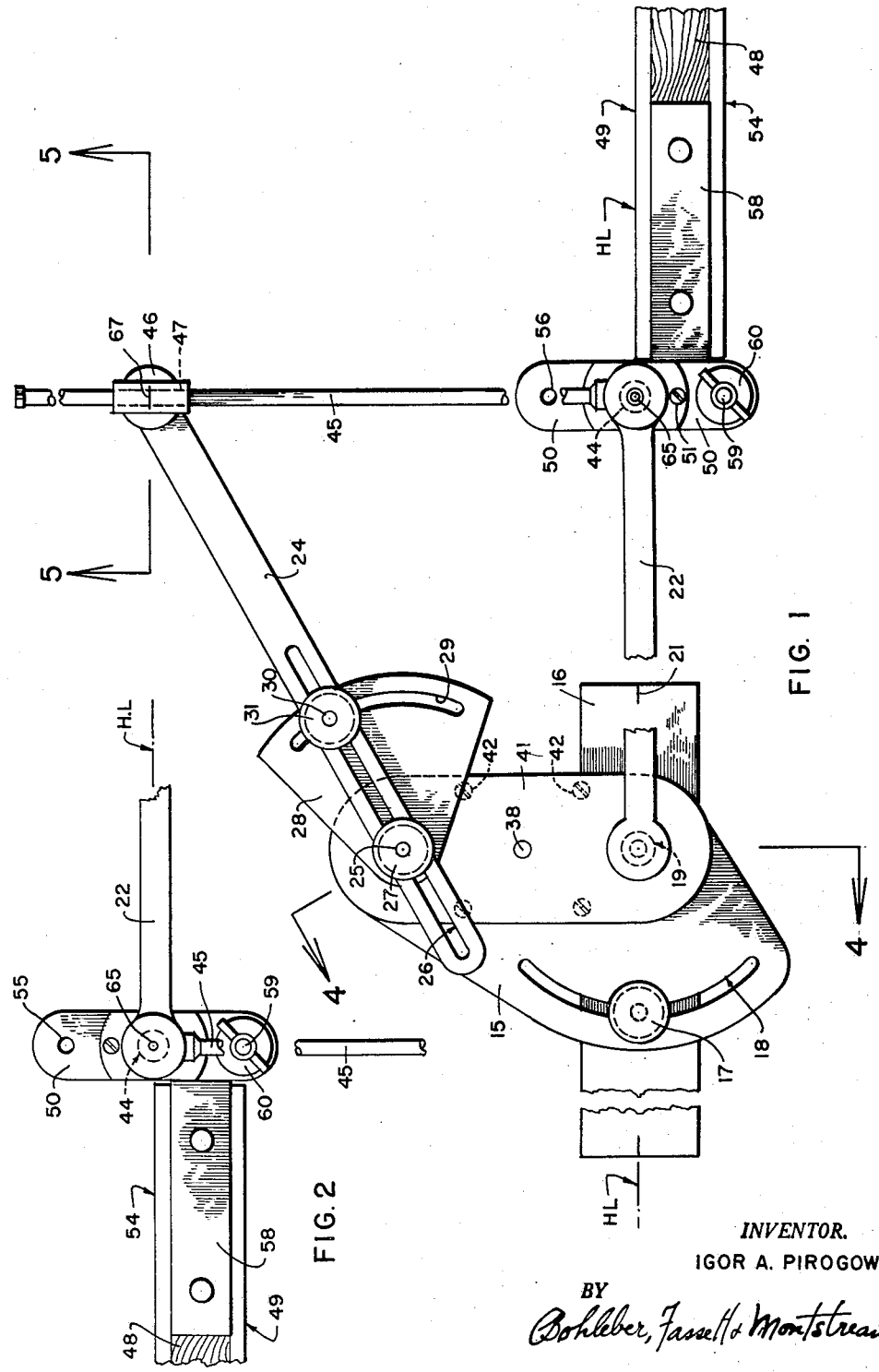
INVENTOR.
IGOR A. PIROGOW
BY
Bohleber, Fassett & Montstream Oct. 7, 1958      I. A. PIROGOW      2,854,750
PERSPECTIVE DRAWING DEVICE
Filed July 15, 1954      7 Sheets-Sheet 2
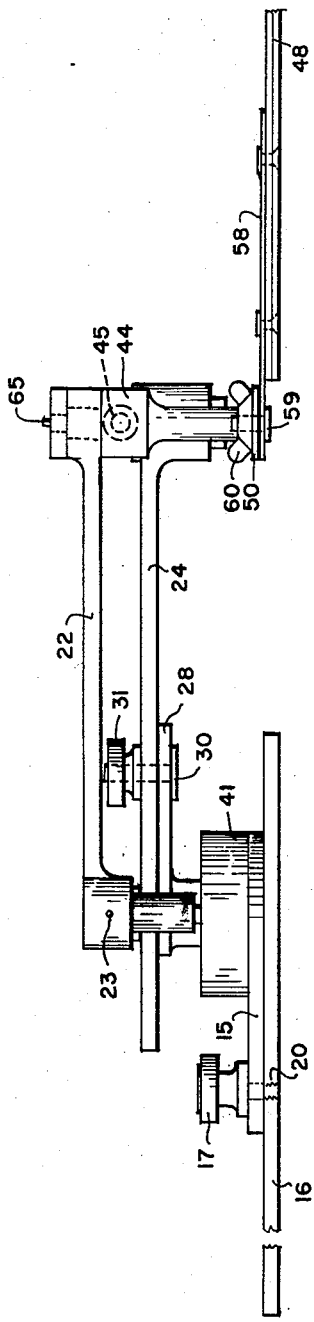
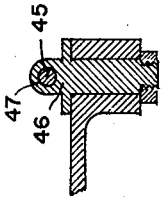
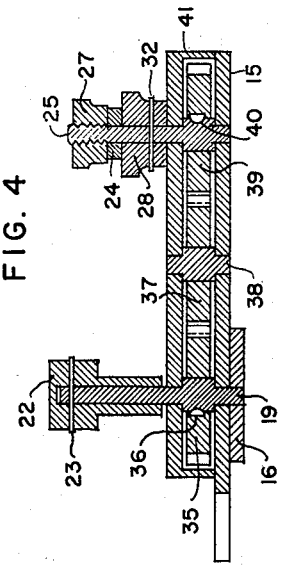
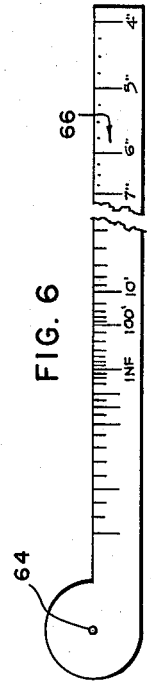
*INVENTOR.*
IGOR A. PIROGOW
BY
*Bohleber, Fassett & Montstream*

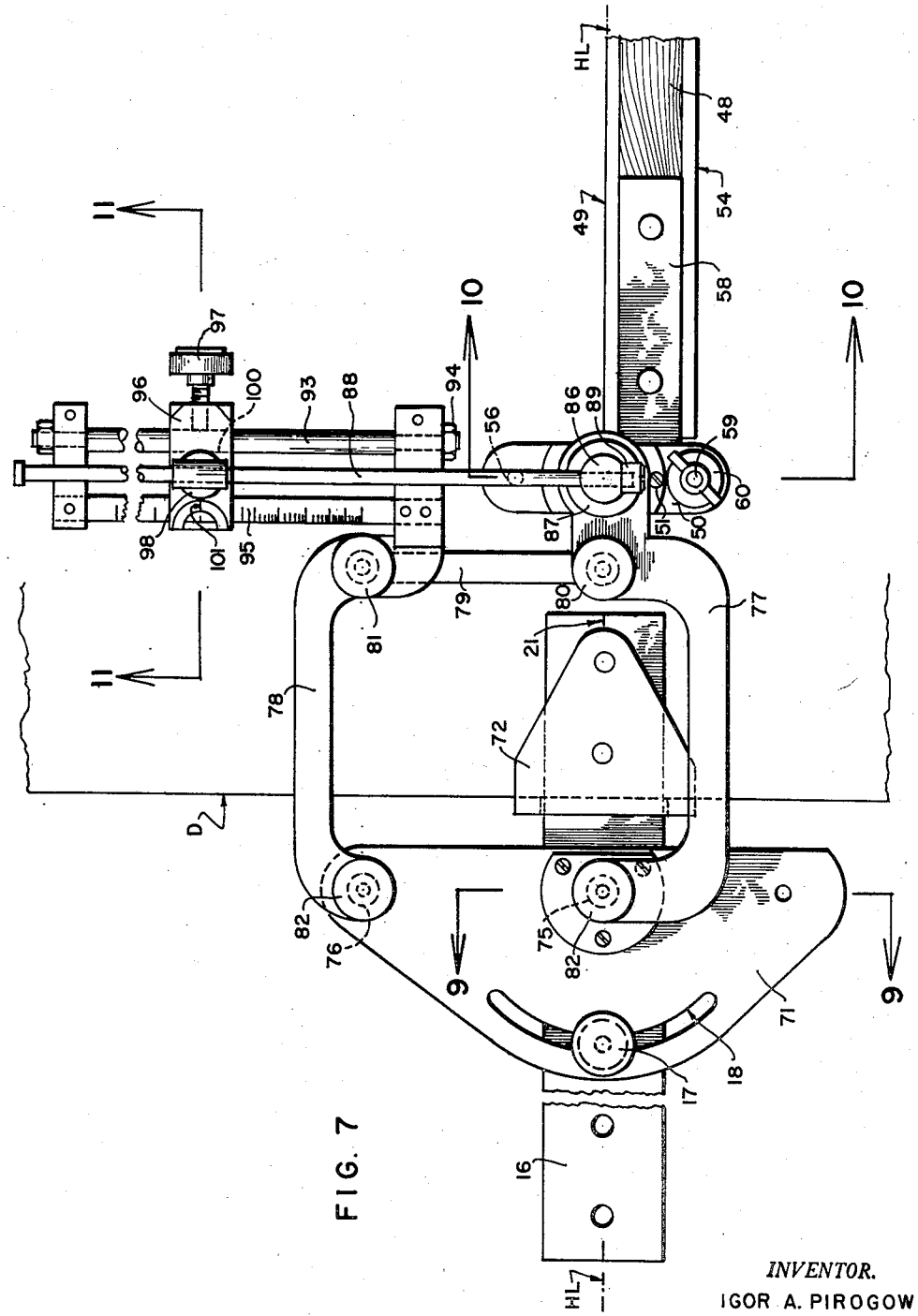

Oct. 7, 1958  I. A. PIROGOW  2,854,750
PERSPECTIVE DRAWING DEVICE
Filed July 15, 1954  7 Sheets-Sheet 4
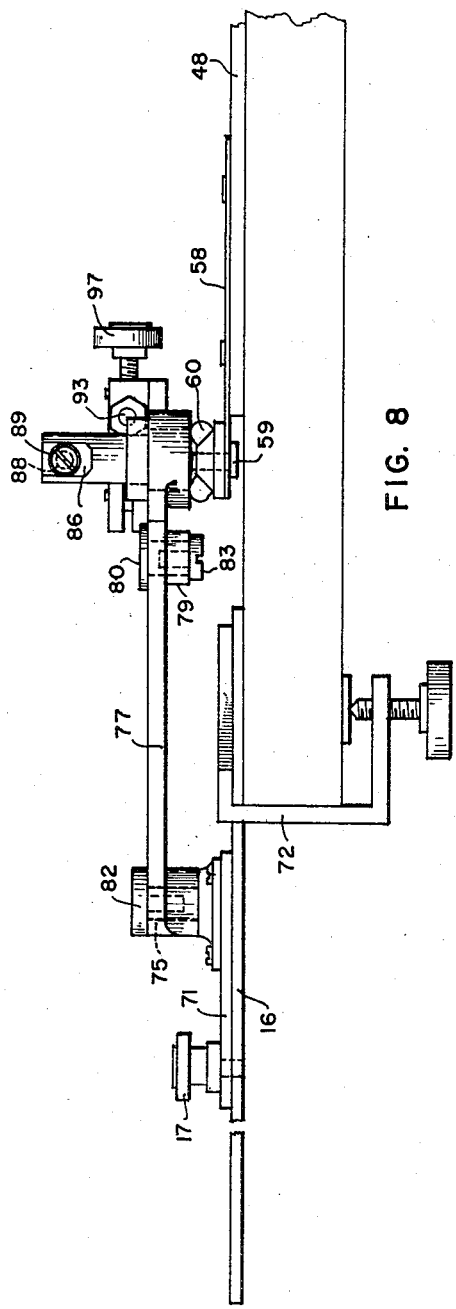
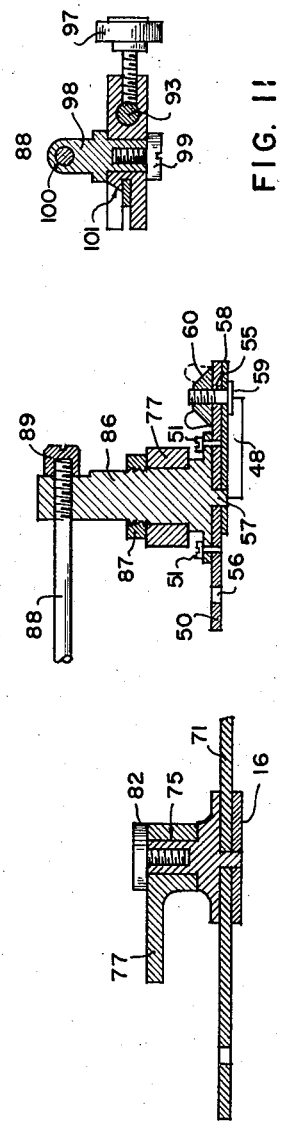
INVENTOR.
IGOR A. PIROGOW
BY
Bohleber, Fasse & Montstream Oct. 7, 1958     I. A. PIROGOW     2,854,750
PERSPECTIVE DRAWING DEVICE Filed July 15, 1954     7 Sheets-Sheet 5

INVENTOR.
IGOR A. PIROGOW

Oct. 7, 1958     I. A. PIROGOW     2,854,750
PERSPECTIVE DRAWING DEVICE

Filed July 15, 1954     7 Sheets-Sheet 6

INVENTOR.
IGOR A. PIROGOW
BY
Bohleber, Fassett & Montetream

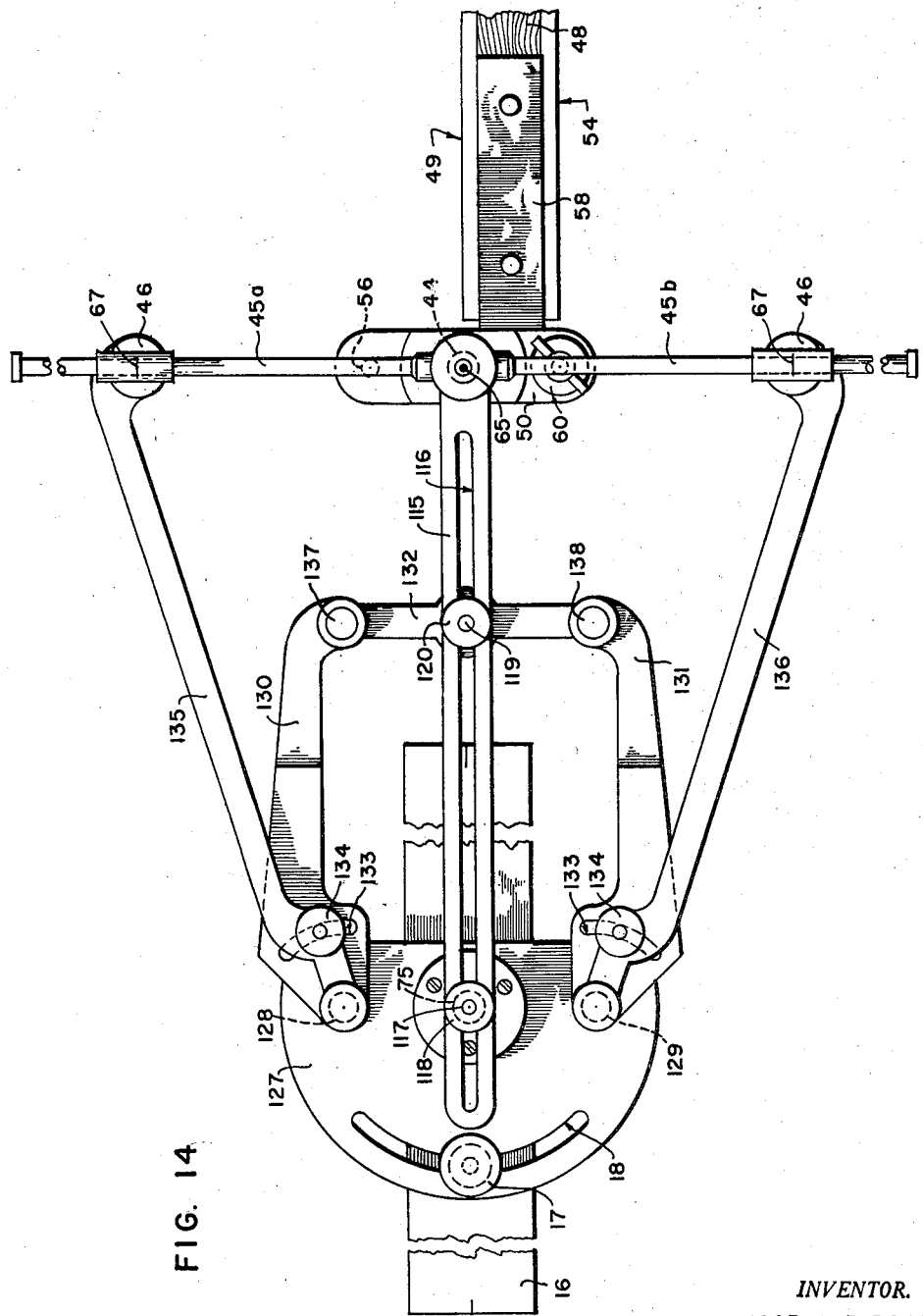

United States Patent Office 2,854,750
Patented Oct. 7, 1958

2,854,750

PERSPECTIVE DRAWING DEVICE

Igor A. Pirogow, New York, N. Y.

Application July 15, 1954, Serial No. 443,607

23 Claims. (Cl. 33—77)

The invention relates to a perspective drawing device by means of which a straight edge may be moved over a drawing board or surface with the ruling edge of the straight edge at all times in line with a vanishing point which may be and usually is off of the drawing board. There is no structure of the device which extends to the vanishing point and all parts of the device are secured to the board either over the board or adjacent thereto. In particular the perspective drawing device is secured or clamped at the edge of the drawing board and the vanishing point may be a few or many feet off of the drawing board yet the ruling edge is directed at all times towards the vanishing point.

It is an object of the invention to construct a perspective drawing device which may be fastened to a drawing board or drawing surface and having a ruling edge which in its movement over the board is in line with a selected vanishing point which may be and usually is off of the drawing board.

Another object is to construct a perspective drawing device as above which may be adjusted to secure a vanishing point at essentially any distance desired.

Another object is to construct a perspective drawing device which may be adjusted to provide for a vanishing point above or below the device.

A still further object is to construct a perspective drawing device as above which can be adjusted to become a parallel drawing device.

Another object is to construct the drawing device which is adjustable to locate the vanishing point on the drawing board.

Another object is to construct a perspective drawing device which may be adjusted to locate the vanishing point above or below the drawing device and at a desired distance from the device.

Again the device may be secured to either side of the drawing board for providing a vanishing point to the right or left.

Another object is to construct a perspective drawing device which is simple in construction and inexpensive to manufacture.

Other objects of the invention will be apparent from the following description when taken in connection with the accompanying drawings illustrating several embodiments thereof in which:

Figure 1 is a top view of one perspective drawing device;

Figure 2 is a top view of the end of the straight edge which is attached to the drawing device;

Figure 3 is a side elevation of the device;

Figure 4 is a longitudinal section of a gear mechanism taken on line 4—4 of Figure 1;

Figure 5 is a section through a guide pivot taken on line 5—5 of Figure 1;

Figure 6 shows a rule for adjusting the device for securing different locations of the vanishing point;

Figure 7 is a top view of another form of a perspective drawing device;

Figure 8 is a side elevation of the drawing device of Figure 7;

Figure 9 is a vertical section of a base pivot taken on line 9—9 of Figure 7;

Figure 10 is a vertical section of the pivot for the ruling edge taken on line 10—10 of Figure 7;

Figure 11 is a vertical section through a guide pivot taken on line 11—11 of Figure 7;

Figure 14 is a top view of a fifth form of a perspective drawing device which may be termed an equilateral trapezoid form.

Figure 12:
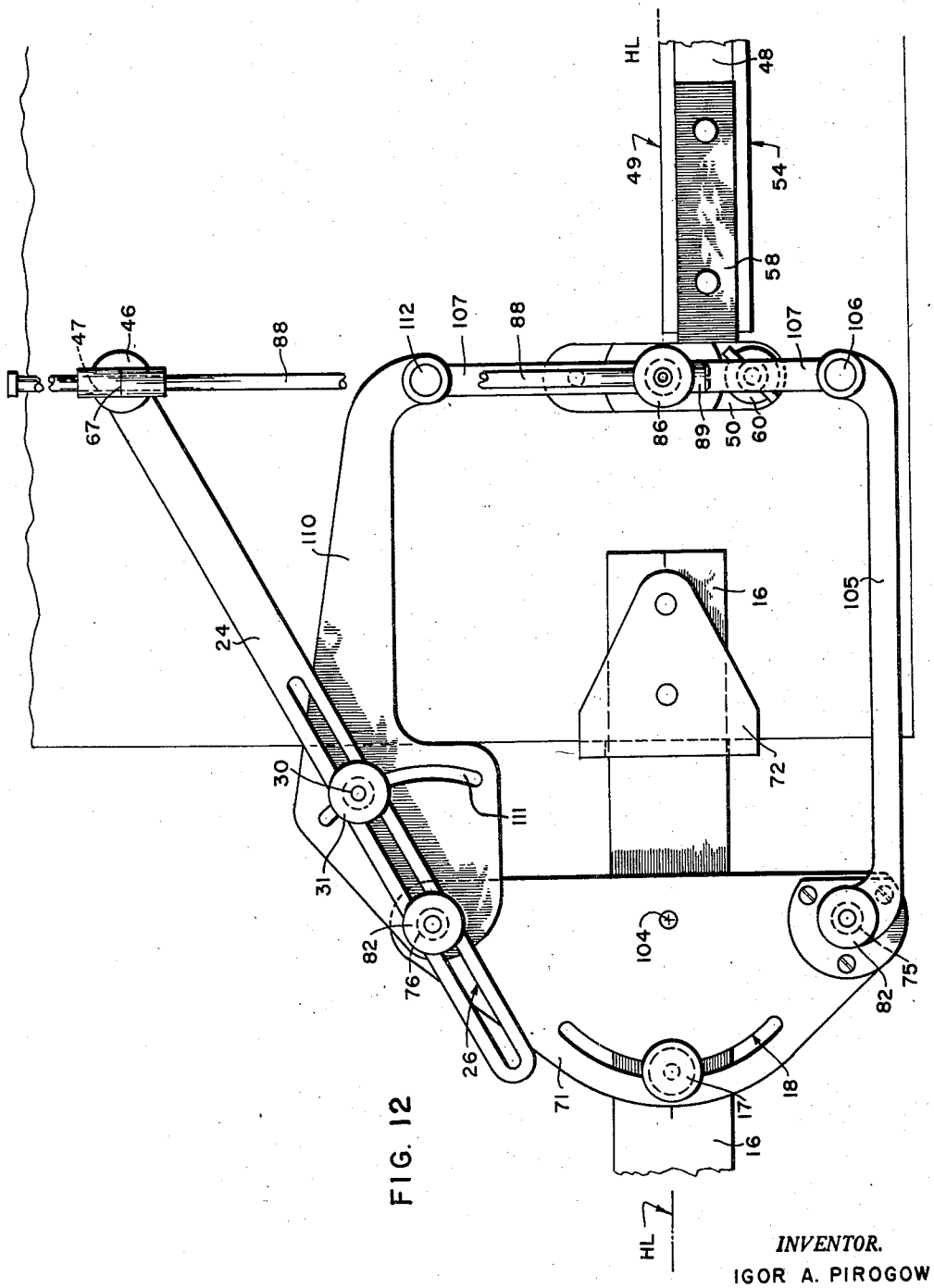
Figure 12 is a top view of a third form of a perspective drawing device.

The perspective drawing device uses the principle of an equilateral trapezoid although in the preferred constructions the device is in the form of a right angle trapezoid, that is, half of an equilateral trapezoid. The device includes a base which is adapted to be secured to the drawing board usually at an edge thereof. For a drawing device in which the vanishing point may be adjusted to a horizontal line or rather position above or below the device, the base includes a frame 15 and an adjusting plate 16 carrying a locking means such as a lock nut 17 which slides in an arcuate slot 18 in the frame. The arc of the slot 18 has as a center, the axis of a pivot 19, the plate having a hole to receive the same so that the frame may pivot about the pivot as a center. The adjusting means described is illustrative of any suitable means for securing angular adjustment of the frame with respect to the drawing board, the plate being secured or clamped to the board and the locking screw 17 anchors the frame to the adjusting plate and thereby secures the frame to the drawing board in adjusted position.

Means are provided to mount the pivot 44 for movement in a circle about a first fixed axis. Means also mount the guide pivot 46 for movement in a circle about a second fixed axis spaced from the first axis. One mounting means is a lever 22 pivotally mounted on the base or frame. In the construction shown the lever 22 is secured to a base pivot 19 such as by a pin 23 so that the pivot turns with the lever as will appear more fully hereinafter. The second mounting means is a lever 24 pivotally mounted upon the base or particularly the frame on a base pivot 25 through a suitable adjustable connection whereby the angularity between the levers 22 and 24 may be adjusted. Angular adjustment necessarily includes adjustment of the length of at least one of the levers, that illustrated being the lever 24. This adjustable connection includes a longitudinal slot 26 in the lever in which is received the pivot 25 and a lock nut 27 may be used if desired at this point. The angular adjustment is secured in any convenient way, that illustrated including an angle plate 28 having an arcuate slot 29 therein and having the axis of the pivot 25 at its center. Locking means, shown as a locking screw 30 and a locking nut 31, has the screw passing through the arcuate slot 29 and the longitudinal slot 26 in the lever to secure the lever in adjusted angular position with respect to the angle plate 28 and in proper adjustment as to length as will appear hereinafter. The angle plate is secured to the pivot 25 in any desirable manner that illustrated being a pin 32 extending through a hub on the angle plate and the pivot 25 as shown in Figure 4.

Means are provided to rotate the mounting means or levers 22 and 24 through equal angles and in the same direction. This may be accomplished in several ways that are particularly illustrated in the construction of Figures 1 through 5 including a gear 35 secured to the pivot 19 such as by a key 36 which gear meshes with an idler gear 37 rotatably mounted in the frame such as on a shaft 38. The idler gear meshes with a gear 39 which is secured to the pivot 25 in any way that is illustrated including a key 40. The gears may be enclosed by a housing 41 secured to the frame 15 such as by the screws 42. The gears 35 and 39 have the same number of teeth so that the two levers will swing together through equal angles and by the provision of the connecting idler gear 37 the two gears and the levers swing together in the same direction. The gears should have no or no perceptible backlash for a high degree of accuracy of the device in both directions of use. Preferably the levers 22 and 24 are mounted in different planes so that there will be no or less interference therebetween as they swing and also the two planes of movement are widely enough separated so that any auxiliary structure such as the locking nut 31 is also cleared. As illustrated the lever 22 is mounted above the lever 24 and the structure carried thereby or associated therewith. Each of the levers constitute a mounting means for a straight edge means as will now be described.

Straight edge means provides the ruling edge for drawing a line in the direction of a vanishing point and includes a vertical pivot 44 from which extends a slide means shown as a bar 45. The pivot 44 is carried by the lever 22 at a point spaced from the base pivot 19 or may be at the end of the lever. The bar is slidably mounted with respect to a guide pivot or guide pivot means including a pivot 46 pivotally carried by the lever 24 spaced from the base pivot 25. The slidable connection particularly illustrated is a guide shown as a hole 47 through the pivot although the connection may take many forms. The axis of the slide means or bar 45 and the axis of the pivot 46 must intersect. A ruling edge means 48 having a ruling edge 49 is secured to the pivot 44 so that it also is secured to the slide means or bar 45 and with the ruling edge at right angles thereto. Any suitable connection between the pivot 44 and the ruling edge means may be used that particularly illustrated including a bracket 50 secured to the pivot such as by screws 51. The ruling edge means is carried on the pivot 44 so that the ruling edge 49 is in line with or its extension intersects the axis of the pivot. The lever 22, therefore, constitutes means for mounting the pivot 44 for the straight edge means upon the base for movement in a circular path about a fixed axis which in this construction is the axis of the base pivot 19. The guide lever 24 and its base pivot constitutes means for mounting the guide pivot 46 upon the base for movement in a circular path about a fixed axis which in the construction shown, is the axis of the base pivot 25.

It is desirable that the perspective drawing device be capable of being mounted upon either side of a drawing board. When this is done the ruling edge 49 would then become the bottom edge of the ruling edge means which is awkward for draftsmen and designers. It is for this reason that the means is constructed so that it may be shifted to the other side of the pivot 44 whereupon the other edge 54 which is now on the upper edge of the ruling edge means becomes a ruling edge and is brought into line with the axis of the pivot 44. The construction is illustrated in Figure 10 in which a bracket 50 has a hole 55 on one side of the pivot 44 and another hole 56 at the other side of the pivot and a center hole therebetween. This latter hole receives a locating nub 57 on the end of the pivot 44 which projects through the hole. The ruling edge means or its attaching bracket 58 has a pair of holes which are aligned with the hole 55 and nub 57 for one position or aligned with the nub 57 and hole 56 for the other position. A locking means such as a locking screw 59 and a wing nut 60 carried thereby is passed through the proper hole 55 or 56 of the attaching bracket 58 and bracket 50 to secure the ruling edge means thereto. It will be noted that in both positions, it is essential that the ruling edge not only extend at right angles to the slide or bar 45 but that the ruling edge or its extension must also be in line with the center of the pivot 44.

An adjusting scale may be carried by the device or it may be separately mounted thereon and removed after adjustment is made. An adjusting scale is shown in Figure 6 which has a hole 64 therein which is received upon a projecting nub 65 carried by the top of the pivot 44 and the desired indicia 66 is matched with an index line 67 on the axis of the pivot 46.

In setting up the perspective drawing device let it be assumed that the horizon line HL is to cross the drafting board and it is drawn thereon at the point desired. The adjusting plate 16 is clamped to the drawing board with an indicia or mark 21 carried thereby aligned with the horizon line which aligns the axis of pivot 19 with the horizon line. The ruling edge 49 is also placed in alignment with the horizon line so that in this initial position the ruling edge is aligned with the axis of the pivot 44 and the axis of the first base pivot 19. The scale 66 is placed in position with the hole on nub 65 and extends along the slide means 45. The locking nuts 31 and 27 have been unloosened and the guide pivot 46 is adjusted vertically to the desired distance on the scale from the pivot 44. This adjustment necessarily adjusts the angular relationship between levers 24 and 22 to correspond with the distance of the vanishing point from the axis of the pivot 19. Assume that the vanishing point is to be ten feet from the axis of the pivot 19 whereupon the lever 24 is adjusted so that the index 67 corresponds with the designation or indicia ten feet on the scale 66. The locking nuts 31 and 27 are then locked in position. Now when the ruling edge 48 is moved, the levers 22 and 24 and hence the pivots 44 and 46 pivot through equal angles and the rule 48 pivots on its pivot 44 relatively to the lever 22 and is guided by the bar 45 which slides relatively to the guide pivot 46 carried by the lever 24. The axis of the slide or the center of the bar 45 at all times intersects or is in alignment with the axis of the pivot 46. Throughout the pivotal movement of the levers 22 and 24 the ruling edge 49 always points towards the selected vanishing point on the horizon line HL which may be proven graphically by laying out various positions or may be proven mathematically. In the initial or adjusting position a line through the axis of pivots 27 and 46 and a line through the axis of pivots 19 and 44 intersect at the adjusted or selected vanishing point.

Figures 7 through 10 show another form of construction which differs from that in Figures 1 through 5 in two principal particulars. The perspective drawing device of Figures 1 to 5 uses a gear connection between the mounting means or levers in order to secure equal angular movement between the pivots or levers or mounting means. In the construction of Figure 7, a parallel linkage construction or parallelogram is used for this purpose. A second particular difference is in the form of the mounting means or lever for the guide pivot which is a right angle lever; nevertheless it is a form of lever essentially similar to the lever 24 of Figure 1. This perspective drawing device is operable in identically the same manner that the device of Figures 1 through 7 is operated. The perspective drawing device has a base which includes a frame 71 having the same arcuate slot 18, lock nut 17 passing therethrough and adjusting plate 16 with its indicia 21 at the end thereof. A C clamp 72 is shown as clamping the base or particularly the adjusting plate 16 to the drawing board D. This clamp may be of any suitable form.

The frame 71 carries a pair of spaced base pivots 75 and 76. A first lever 77 is pivotally carried on the pivot 75 and a lever 78 is pivotally carried on the pivot 76. A parallel linkage is formed by the link 79 pivotally secured to the lever 77 on a pivot 80 and the other end pivotally secured to the lever 78 on a pivot 81. This parallel linkage comprises means equivalent to the gears of Figure 4 for moving the levers or mounting means or pivots 86 and 98 through equal angles in the same direction.

Headed screws 82 may retain the arms 77 and 78 on their respective pivots 75 and 76 and headed screws 83 retain the connecting link 79 to the respective pivots 80 and 81. The levers 77, 78 and 79 form a parallelogram. The parallelogram may have any relationship whatever between the distances between the axis of the pivots so long as a parallelogram is formed. The greater the relation between the dimension from the straight edge means pivot and its center of rotation and the dimension from the two centers of rotation namely for the straight edge means pivot and the guide pivot, the greater is the permitted angular range of the device. The parallelogram's primary function is to impose equal angular movements between the pivots 86 and 98, or between levers 77 and 78, in the same direction and a parallelogram has this characteristic.

Straight edge means are provided which includes a pivot 86 carried by the lever 77 and secured thereto by a nut 87 which pivot carries the bracket 50 and the ruling edge means described in connection with the construction of Figure 1 and hence needs no further description. A slide means in the form of a rod 88 is secured to the pivot such as by a nut 89 which is received on the thread end of the rod. The slide means or rod 88 must extend at right angles to the ruling edge 49 of the ruling edge means 48 and the axis of the slide means must be in line with the axis of the pivot 86 and the ruling edge must also be in line with the axis of the pivot 86. The straight edge means includes a guide pivot 98 which will be described hereinafter.

The lever 78 carries an extension 93 which extends at right angles to a line through the axis of the pivots 76 and 81. The extension may be constructed in many ways that illustrated including a bar 93 which is spaced outwardly from the pivot 81 and secured to the lever 78 by a nut 94. Preferably a scale 95 is secured adjacent and parallel to the bar 93 and fastened thereto by suitable means. The bar 93 carries an adjustable guide pivot 96 which is slidably adjustable along the bar 93 and is anchored in adjusted position by a lock screw 97. A pivot 98 is carried by the guide pivot 96 and secured thereon by a screw 99. The slide means or rod 88 is slidably received in a suitable guide carried by the guide pivot that illustrated being a hole 100 therethrough in line with the axis of the pivot. The adjustable guide pivot preferably carries an index 101 for use in selecting the distance between the axis of pivot 98 and the axis of pivot 86 from the indicia on the scale 95, which determines the distance of the vanishing point from the base pivot 75. The scale 95 preferably is slidable in a groove carried by the adjustable guide pivot 96.

The perspective drawing device of Figure 7 operates very much the same as that of Figure 1. The only difference is one of appearance between the levers 78 and 24. The length of the lever 78 appears not to be varied; in effect, however, the length of the lever between the axes of pivot 98 and base pivot 76 is varied whenever adjustment is made of the distance between the guide pivot 96 and the pivot 86. Since the effective length of the lever is the distance between the axis of the base pivot 76 and the axis of the pivot 98, likewise any adjustment of the position of the guide pivot constitutes a variation in the angular relation between the lever 77 and the effective form of the lever 78, which is established by a line between the center of the pivot 78 and that of the pivot 98. It is noted therefore that with a lever of the form of lever 78 a single adjustment, adjusts both the distance between pivots and the angular relation between a center line through pivots 75, 86 and a center line through pivots 76 and 98. This form of lever may be used with any of the devices illustrated. The drawing device may also be mounted on the left hand side of the drawing board in which event the ruling edge means 48 has its position changed on the bracket 50 to bring the ruling edge 54 into line with the pivot 86 as described in connection with the construction of Figure 1.

The lever 77 with its base pivot 75 comprises means mounting the pivot 86 of the straight edge means upon the base for movement in a circle about a fixed axis as a center which axis in the construction illustrated is the axis of the base pivot 75. Likewise the lever 78 with its extension 93 comprises means mounting the guide pivot 98 upon the base for movement in a circle about a fixed axis as a center which axis is the axis of the base pivot 76. For a perspective device, the radius distance from the center of base pivot 76 to the center of the guide pivot 98 is greater than the radius distance between the center of base pivot 75 and the center of pivot 86. The device is adjusted for the position or distance of the vanishing point when in the initial position illustrated when the ruling edge 49 is in line with the fixed axis of rotation which in the construction illustrated is the center of the base pivot 75. In this position the intersection of a line through the centers of the guide pivot and the base pivot 76 with the horizon line through centers of the pivots 86, 75 is the vanishing point.

Figure 12 illustrates a perspective drawing device which is like the device of Figure 1 but differs therefrom in two respects, first in substituting a parallelogram means for the gear means of Figure 1 as the means for securing circular movement of the pivot for the straight edge means and the guide pivot, or for securing movement of the pivots 46 and 86 through equal angles and in the same direction and secondly in showing that the mounting means for these pivots need not be a single lever so long as the pivots are moved on a circular path about a fixed axis. A parallelogram may serve as the means for securing equal angular movement of the pivots and may also serve as the mounting means for the pivots for that particularly shown is for the pivot 86 for the straight edge means. The base including the adjusting plate 16, frame 71 and the base pivots 75 and 76 are the same as that of Figure 7 and need not again be described although base pivot 75 is differently located as will appear. A lever 105 is pivotally mounted upon the base pivot 75 which is spaced from the base pivot 76 and also from the center of circular movement or the fixed axis 104. It carries a pivot 106 upon which one end of a connecting link 107 is mounted.

The straight edge means includes the pivot 86 from which extends the ruling edge means 48 and the slide means 88 at right angles to the ruling edge 49 and a guide pivot 46 all of which has been previously described and have been given the same numbers. The lever 24 with its pivot 46, lock nut 82 and locking means 30 and 31 is the same as the construction of Figure 1 and comprises means for mounting the guide pivot on the base for moving the guide pivot in a circular path about a fixed axis which is the axis of the base pivot 76.

An angle plate 110 is pivoted on the pivot 76 and carries an arcuate slot 111 which is arcuate on the axis of the pivot 76 as a center. The clamping screw 30 passes through the slot 26 in the lever 24 and the slot 111 in the lever 110 so that when the lever 24 has been adjusted to the desired angular relation or with the desired spacing between the pivot 86 and guide pivot 46 of the straight edge means when in adjusting position, it is locked in that position by the clamping means formed by the clamping screw 30 and lock nut 31. The connecting link 107 is pivotally connected on pivot 112 to the lever 110 so that the levers 105 and 110 with the link 107 form a parallelogram between the four pivots 75, 76, 112 and 106. This parallelogram assures that, when the ruling edge means 48 is moved, the mounting means formed by levers 105 and 24 or particularly the pivots 86 and 46, will move through equal angles in the same direction. The device is adjusted for the vanishing point and operated in the same manner as described with respect to the device of Figure 1.

The pivot 86 for the straight edge means is moved in a circular path having a fixed axis at point 104 because any point on the connecting link 107 of the parallelogram moves in a circle the radius of which is the same as the distance between the center of pivots 75 and 106. It will be observed therefore that the means for securing equal angular movement of the guide pivot 46 and the pivot 86 for the straight edge means also serves as means for moving the latter pivot in a circular path about a center or axis 104.

Figure 13:
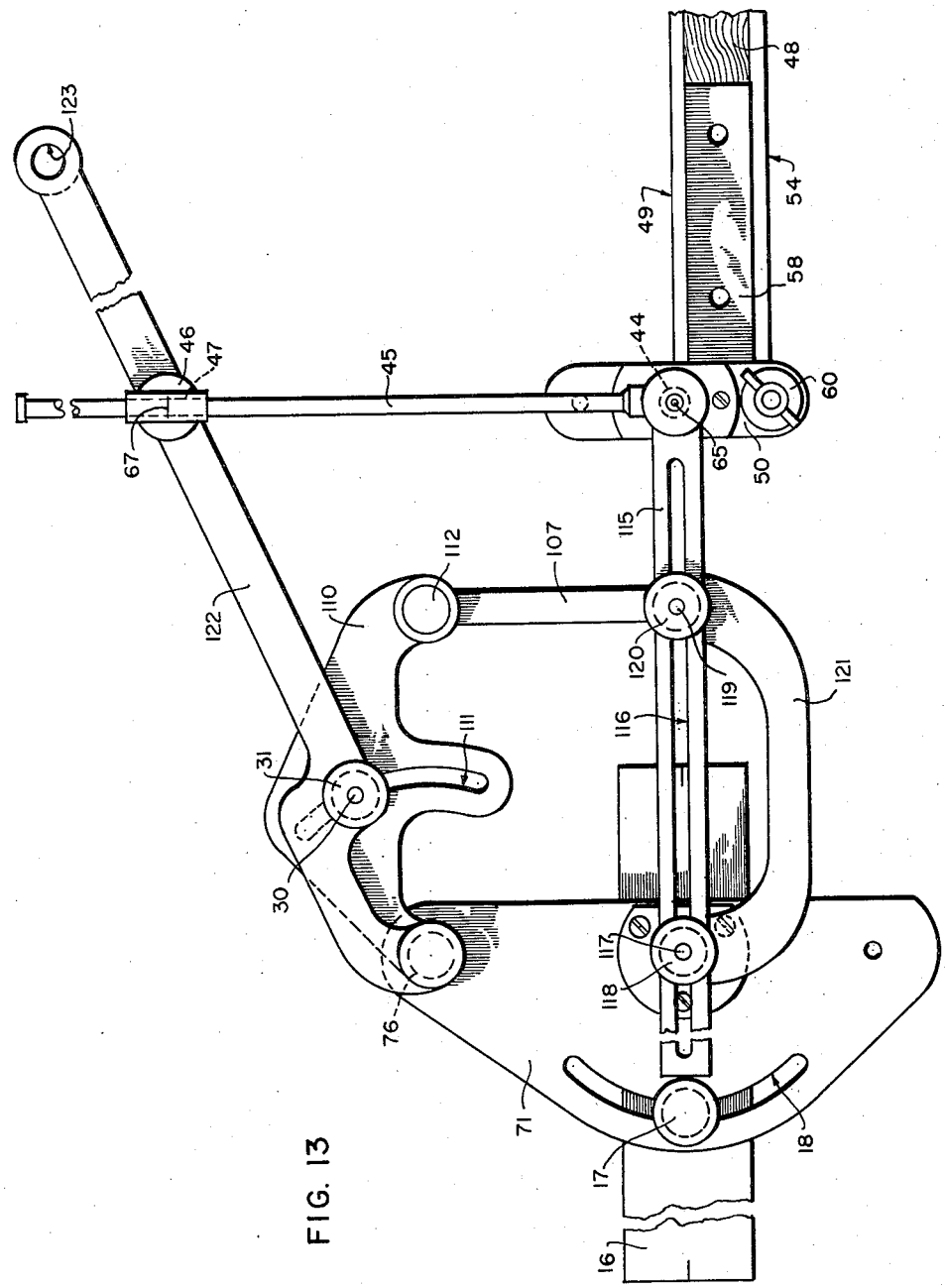
Figure 13 is a top view of a fourth form of a perspective drawing device.

Figure 13 illustrates a perspective drawing device similar to that of Figure 12 so that similar parts are similarly numbered. The straight edge means with its pivot 44, slide means 45, ruling edge means 48 and guide pivot 46 is the same as previously described. The base construction is also the same as well as the parallelogram form of means for moving the levers or the pivots 44 and 46 through equal angles. The device of Figure 13 differs in that it is the lever 115 which carries a slot and is adjustable as to length by having a longitudinal slot 116 therein which slot receives the base pivot 117 by which the lever is pivotally secured to the frame 71. The pivot 117 carries a lock nut 118 for locking the lever 115 in adjusted position. The slot also receives the pivot 119 which may also carry a lock nut 120. An arm 121 provides one arm of a parallelogram formed by arm 110, connecting link 107 and arm 105 so that the levers 115 and 122 and the pivots 44 and 46 move through equal angular distances in the same direction. The lever 122 has a pivot hole spaced from the base pivot 76 which receives the guide pivot 46.

The lever 122 may carry a pivot hole 123 spaced from the location of the guide pivot 46 so that the pivot may be removed from its present location to the pivot hole 123 thereby increasing the length of this lever. When this pivot hole is used, the lever 115 is adjusted outwardly to a position where the ruling edge 49 is in line with the center of the base pivot 117 in initial or adjusting position. In this initial position the bar 45 is at right angles to a line through the centers of the pivots 44 and 117. The two pivot holes carried by the lever 122 makes this lever adjustable also but in a different manner. In other words it has adjustments of fixed length for each of the holes provided in the lever. A different scale 66, however, must be used for each position. It will be observed, therefore, that lever 122 is also adjustable so that the form of construction illustrated in Figure 13 may be defined as one in which the lever 115 is adjustable only and also one in which both levers 115 and 122 are adjustable if desired. The drawing device of Figure 13 is set up for use in the same manner that the drawing device of the previous figures is set up. In other words by changing the distance or dimension between the pivot 44 for the straight edge means and the guide pivot 46, the position of the vanishing point may be adjusted at will. This adjustment may also be described as changing the angularity between the levers.

In the constructions heretofore illustrated and described the form of the drawing device may be described as a right angle trapezoid in that in initial or adjusting position the horizontal lever forms one leg of the trapezoid, the frame and the bar 45 provide the parallel sides and the angularly directed lever is the angularly disposed leg of the trapezoid.

Figure 14 illustrates a construction of perspective drawing device which is an equilateral trapezoid in initial position. It includes a frame 127 having an arcuate adjusting slot 18 and a locking means 17 for locking the frame in adjusted position. The frame includes a pair of spaced base pivots 128 and 129 upon each of which is pivotally mounted an arm. The arms 130 and 131 are in turn connected together by a connecting link 132 through pivots 137 and 138. The arms 130 and 131 and connecting link 132 provide a parallelogram which forms means for moving the levers and the pivots carried thereby through equal angles in the same direction as will appear more fully hereinafter.

Each arm 130 and 131 carries an arcuate slot 133 in which is received locking means 134 for locking levers 135 and 136 in adjusted angular position. Each of the levers carries a guide pivot 46 spaced from its respective base pivots 128 and 129 but the pivot distance of each of the levers is equal.

A slotted lever 115 which is the same as that illustrated in Figure 13 is adjustably secured to the mid point of the connecting link 132 by suitable locking means 119, 120. The slot 116 also passes through locking means 117, 118 carried by the base pivot 75 which is carried by the frame 127 and located midway between pivots 128 and 129. With this arrangement the lever 115 swings through equal angles with the movement of the levers 135 and 136.

The straight edge means is like that previously described but differs therefrom in that the slide means is a bar or bars 45a and 45b extending in opposite directions from the pivot 44 to which it is or they are secured at right angles to the ruling edge 49 and its axis passing through the axis of the pivot 44. The ruling edge means 48 is carried by the pivot 44 having a ruling edge 49 which is in alignment with the center of the pivot.

The perspective drawing device of Figure 14 is set up in a manner similar to that in the devices previously described excepting that both levers 135 and 136 are adjusted to the same distance between the pivot 44 for the straight edge means and the guide pivots 46 or the same angular relation between the levers 135, 136 and the lever 115 depending upon where it is desired to have the vanishing point. It is necessary that the two levers 135 and 136 be adjusted to the same angle or the same distance between the nub 65 and the center of each guide pivot 46. During the adjustment of the levers 135 and 136 the locking means 119, 120 and 117, 118 are free so that the radial lever 115 may take its proper position. With the angular levers 135, 136 adjusted to equal angles or equal distances of the guide pivots and with the ruling edge 49 in line with the axis of the pivot 75, the locking means for the levers 115, 135 and 136 are clamped in position. Thereafter upon any movement of the straight edge means, the ruling edge 49 will always be in line with the same vanishing point on the horizon line. The operation of the equilateral trapezoid form of construction of Figure 14 is the same as that in the other constructions in that the pivot 44 for the straight edge means moves in a circle about a fixed axis which is the axis of base pivot 75 and the guide pivot means or the guide pivot 46 of each lever moves in a circle about a fixed axis which is the axis of its respective base pivot 128, 129 and determine the position of the slide means or bars 45a and 45b. Even if the locking means 117, 118 or 119, 120 are not locked the pivot 44 would move in a circle from the axis of pivot 75 as a center being guided in a circle by the guide pivots. In other words the function performed by lever 115 is to keep the pivot for the straight edge means moving through equal angles with the guide pivots.

In the various forms of construction illustrated, the guide pivot means includes at least one guide pivot in that it may be a single guide pivot as in the constructions of Figures 1 to 13 inclusive or may include two guide pivots as in the construction of Figure 14. The constructions illustrated show too that either or both of the levers may be adjustable in order to select the distance or location of the vanishing point. Likewise the device may have no adjustment of the levers if it is desired to make it for a single vanishing point at a fixed distance. The arcuate slot 29 of Figure 1 and the like slot 111 of Figure 12 extend below a parallel position for the two levers so that the vanishing point may be on the board if desired or to the right of the device. If the guide pivot is adjusted to a distance from the pivot for the straight edge means which is equal to the spacing between the fixed axis or the axes of the base pivots, then the ruling edge 48 moves in parallel relation since the vanishing point is adjusted to infinity. The device therefore is primarily a perspective drawing device although it may be adjusted to be a parallel rule. The vanishing point can be calculated by a proportion formula based on similar right triangles.

The invention is presented to fill a need for improvements in a perspective drawing device. It is understood that various modifications in structure, as well as changes in mode of operation, assembly, and manner of use, may and often do occur to those skilled in the art, especially after benefitting from the teachings of an invention. Hence, it will be understood that this disclosure is illustrative of preferred means of embodying the invention in useful form by explaining the construction, operation and advantages thereof.

What is claimed is:

1. A perspective drawing device comprising a base; straight edge means including a pivot having a vertical axis, slide means extending from the pivot and having an axis, means forming a part of the straight edge means having a ruling edge extending at right angles to the slide means and in line with the axis of the pivot for the straight edge means, and guide pivot means including at least one guide pivot having a vertical axis and a guide slidably receiving the slide means with the axis of the guide pivot intersecting the axis of the slide means; means mounting said guide pivot upon the base for movement in a circle about a fixed axis, means mounting the pivot for the straight edge means upon the base for movement in a circle about a fixed axis spaced from the other fixed axis and means connecting the two mounting means for movement together through equal angles and in the same direction, the radius of the circle for the guide pivot being greater than that for the pivot of the straight edge means, and the axis of the slide means being parallel with the fixed axes when the ruling edge is in line with the fixed axis for the pivot for the straight edge means.

2. A perspective drawing device comprising a base; straight edge means including a pivot having a vertical axis, slide means extending from the pivot and having an axis, means forming a part of the straight edge means having a ruling edge extending at right angles to the slide means and in line with the axis of the pivot for the straight edge means, and guide pivot means including at least one guide pivot having a vertical axis and a guide slidably receiving the slide means with the axis of the guide pivot intersecting the axis of the slide means; means mounting said guide pivot upon the base for movement in a circle about a fixed axis, means mounting the pivot for the straight adge means upon the base for movement in a circle about a fixed axis spaced from the other fixed axis and means connecting the two mounting means for movement together through equal angles and in the same direction, means for adjusting the distance between each guide pivot and the pivot for the straight edge means.

3. A perspective drawing device as in claim 2 in which the base includes a frame, a plate and means to adjust the angular relation between the frame and plate.

4. A perspective drawing device comprising a base; straight edge means including a pivot having a vertical axis, slide means extending from the pivot and having an axis, means forming a part of the straight edge means having a ruling edge extending at right angles to the slide means and in line with the axis of the pivot for the straight edge means, and guide pivot means including at least one guide pivot having a vertical axis and a guide slidably receiving the slide means with the axis of the guide pivot intersecting the axis of the slide means; means mounting the pivot for the straight edge means upon the base for movement in a first circle about a first fixed axis, means mounting said guide pivot for movement in a circle about a fixed axis spaced from the first fixed axis and at a radius greater than the radius of the first circle, the axis of the slide means being parallel with the first and second fixed axes when the ruling edge is in line with the first fixed axis, and means connecting the mounting means together for movement through equal angles and in the same direction.

5. A perspective drawing device comprising a base including a frame, a plate and means to adjust the angular relation of the frame to the plate; straight edge means including a pivot having a vertical axis, slide means extending from the pivot and having an axis, means forming a part of the straight edge means having a ruling edge extending at right angles to the slide means and in line with the axis of the pivot for the straight edge means, and guide pivot means including at least one guide pivot having a vertical axis and a guide slidably receiving the slide means with the axis of the guide pivot intersecting the axis of the slide means; means mounting the pivot for the straight edge means upon the base for movement in a first circle about a first fixed axis, means mounting said guide pivot for movement in a circle about a fixed axis spaced from the first fixed axis and at a radius greater than the radius of the first circle, the axis of the slide means being parallel with the first and second fixed axes when the ruling edge is in line with the first fixed axis, and means connecting the two mounting means together for movement together through equal angles.

6. A perspective drawing device comprising a base; straight edge means including a pivot having a vertical axis, slide means extending from the pivot and having an axis, means forming a part of the straight edge means having a ruling edge on each edge thereof one of which extends at right angles to the slide means and in line with the axis of the pivot for the straight edge means, means carried by the pivot for moving the other ruling edge into line with the axis of the pivot, and guide pivot means including at least one guide pivot having a vertical axis and a guide slidably receiving the slide means with the axis of the guide pivot intersecting the axis of the slide means; means mounting the pivot for the straight edge means upon the base for movement in a first circle about a first fixed axis, means mounting said guide pivot for movement in a circle about a fixed axis spaced from the first fixed axis and at a radius greater than the radius of the first circle, means connecting the two mounting means together for movement together through equal angles and in the same direction, means for adjusting the distance between the guide pivot and the pivot for the straight edge means, and means for adjusting the length of at least one of the mounting means.

7. A perspective drawing device comprising a base; straight edge means including a pivot having a vertical axis, slide means extending from the pivot and having an axis, means forming a part of the straight edge means having a ruling edge extending at right angles to the slide means and in line with the axis of the pivot for the straight edge means, and guide pivot means including at least one guide pivot having a vertical axis and a guide slidably receiving the slide means with the axis of the guide pivot intersecting the axis of the slide means; means mounting the pivot for the straight edge means upon the base for movement in a first circle about a first fixed axis, means mounting said guide pivot for movement in a circle about a fixed axis spaced from the first fixed axis and at a radius greater than the radius of the first circle, means connecting the two mounting means for movement together through equal angles and in the same direction, and means for adjusting the distance between the guide pivot and the pivot for the straight edge means.

8. A perspective drawing device comprising a base including a frame, a plate and means to adjust the angular relation of the frame to the plate; straight edge means including a pivot having a vertical axis, slide means extending from the pivot and having an axis, means forming a part of the straight edge means having a ruling edge extending at right angles to the slide means and in line with the axis of the pivot for the straight edge means, and guide pivot means including at least one guide pivot having a vertical axis and a guide slidably receiving the slide means with the axis of the guide pivot intersecting the axis of the slide means, means mounting the pivot for the straight edge means upon the base for movement in a first circle about a first fixed axis, means mounting said guide pivot upon the base for movement in a circle about a fixed axis spaced from the first fixed axis and at a radius greater than the radius of the first circle, means connecting the two mounting means together for movement together through equal angles and in the same direction, and means for adjusting the distance between each guide pivot and the pivot for the straight edge means.

9. A perspective drawing device comprising a base; straight edge means including a pivot having a vertical axis, slide means extending from the pivot and having an axis, means forming a part of the straight edge means having a ruling edge extending at right angles to the slide means and in line with the axis of the pivot for the straight edge means, and guide pivot means including at least one guide pivot having a vertical axis and a guide slidably receiving the slide means with the axis of the guide pivot intersecting the axis of the slide means, means mounting the pivot for the straight edge means upon the base for movement in a circle including a lever and a base pivot carried by the base, means mounting said guide pivot for movement in a circle about a fixed axis spaced from the first fixed axis and at a radius greater than the radius of the first circle, the axis of the slide means being parallel with the base pivot and fixed axis when the ruling edge is in line with the base pivot, and means connecting the two mounting means together for movement together through equal angles and in the same direction.

10. A perspective drawing device comprising a base; straight edge means including a pivot having a vertical axis, slide means extending from the pivot and having an axis, means forming a part of the straight edge means having a ruling edge extending at right angles to the slide means and in line with the axis of the pivot for the straight edge means, and guide pivot means including at least one guide pivot having a vertical axis and a guide slidably receiving the slide means with the axis of the guide pivot intersecting the axis of the slide means, means mounting the pivot for the straight edge means upon the base for movement in a first circle about a first fixed axis, means mounting said guide pivot upon the base for movement in a circle including a lever and a base pivot carried by the base spaced from the first fixed axis and the lever having a radius greater than the radius of the first circle, the axis of the slide means being parallel with the first fixed axis and the base pivot when the ruling edge is in line with the first fixed axis, and means connecting the two mounting means together for movement together through equal angles and in the same direction.

11. A perspective drawing device comprising a base; straight edge means including a pivot having a vertical axis, slide means extending from the pivot and having an axis, means forming a part of the straight edge means having a ruling edge extending at right angles to the slide means and in line with the axis of the pivot for the straight edge means, and guide pivot means including at least one guide pivot having a vertical axis and a guide slidably receiving the slide means with the axis of the guide pivot intersecting the axis of the slide means; means mounting the pivot for the straight edge means upon the base for movement in a circle including a first lever and a first base pivot carried by the base, means mounting said guide pivot for movement in a circle including a guide lever for each guide pivot and a base pivot for each guide lever carried by the base spaced from the first base pivot and the lever having a length between pivots greater than the length between pivots of the first lever, the axis of the slide means being parallel with the base pivots when the ruling edge is in line with the first base pivot, and means connecting the two mounting means together for movement together through equal angles and in the same direction.

12. A perspective drawing device comprising a base including a frame, a plate and means to adjust the angular relation of the frame to the plate; straight edge means including a pivot having a vertical axis, slide means extending from the pivot and having an axis, means forming a part of the straight edge means having a ruling edge extending at right angles to the slide means and in line with the axis of the pivot for the straight edge means, and guide pivot means including at least one guide pivot having a vertical axis and a guide slidably receiving the slide means with the axis of the guide pivot intersecting the axis of the slide means, means mounting the pivot for the straight edge means upon the base for movement in a circle including a first lever and a first base pivot carried by the base, means mounting said guide pivot for movement in a circle including a guide lever for each guide pivot and a base pivot for each guide lever carried by the base spaced from the first base pivot and the lever having a length between pivots greater than the length between pivots of the first lever, the axis of the slide means being parallel with the base pivots when the ruling edge is in line with the first base pivot, and means connecting the two mounting means together for movement together through equal angles and in the same direction.

13. A perspective drawing device comprising a base; straight edge means including a pivot having a vertical axis, slide means extending from the pivot and having an axis, means forming a part of the straight edge means having a ruling edge extending at right angles to the slide means and in line with the axis of the pivot for the straight edge means, and guide pivot means including at least one guide pivot having a vertical axis and a guide slidably receiving the slide means with the axis of the guide pivot intersecting the axis of the slide means, means mounting the pivot for the straight edge means upon the base for movement in a circle including a first lever and a first base pivot carried by the base, means mounting said guide pivot for movement in a circle including a guide lever for each guide pivot and a base pivot for each guide lever carried by the base spaced from the first base pivot and each guide lever having a length between pivots greater than the length between pivots of the first lever, and means connecting the two mounting means together for movement together through equal angles and in the same direction, means for adjusting the distance between each guide pivot and the pivot for the straight edge means, and means for adjusting the length of at least one of the mounting means.

14. A perspective drawing device comprising a base including a frame, a plate and means to adjust the angular relation of the frame to the plate; straight edge means including a pivot having a vertical axis, slide means extending from the pivot and having an axis, means forming a part of the straight edge means having a ruling edge extending at right angles to the slide means and in line with the axis of the pivot for the straight edge means, and guide pivot means including at least one guide pivot having a vertical axis and a guide slidably receiving the slide means with the axis of the guide pivot intersecting the axis of the slide means, means mounting the pivot for the straight edge means upon the base for movement in a circle including a first lever and a first base pivot carried by the base, means mounting said guide pivot for movement in a circle including a guide lever for each guide pivot and a base pivot for each guide lever carried by the base spaced from the first base pivot and the lever having a length between pivots greater than the length between pivots of the first lever, means connecting the two mounting means together for movement together through equal angles and in the same direction, means for adjusting the distance between the guide pivot and the pivot for the straight edge means, and means for adjusting the length of at least one of the mounting means.

15. A perspective drawing device comprising a base; straight edge means including a pivot having a vertical axis, slide means extending from the pivot and having an axis, means forming a part of the straight edge means having a ruling edge extending at right angles to the slide means and in line with the axis of the pivot for the straight edge means, and a guide pivot having a vertical axis and a guide slidably receiving the slide means with the axis of the guide pivot intersecting the axis of the slide means; a first lever carrying the pivot for the straight edge means for movement in a circle, a first base pivot mounting the lever on the base, a guide lever carrying the guide pivot for movement in a circle, a second base pivot mounting the guide lever on the base spaced from the first base pivot, means connecting the two levers together for movement through equal angles and in the same direction, and means for adjusting the distance between the guide pivot and the pivot for the straight edge means.

16. A perspective drawing device comprising a base; straight edge means including a pivot having a vertical axis, slide means extending from the pivot and having an axis, means forming a part of the straight edge means having a ruling edge extending at right angles to the slide means and in line with the axis of the pivot for the straight edge means, and a guide pivot having a vertical axis and a guide slidably receiving the slide means with the axis of the guide pivot intersecting the axis of the slide means; a first lever carrying the pivot for the straight edge means for movement in a circle, a first base pivot mounting the lever on the base, a guide lever carrying the guide pivot for movement in a circle, a second base pivot mounting the guide lever on the base spaced from the first base pivot, the guide lever having a length between pivots greater than the length between pivots of the first lever, means connecting the two levers together for movement through equal angles and in the same direction, means for adjusting the distance between the guide pivot and the pivot for the straight edge means, and means for adjusting the length of at least one of the levers.

17. A perspective drawing device comprising a base; straight edge means including a pivot having a vertical axis, slide means extending from the pivot and having an axis, means forming a part of the straight edge means having a ruling edge extending at right angles to the slide means and in line with the axis of the pivot for the straight edge means, and a guide pivot having a vertical axis and a guide slidably receiving the slide means with the axis of the guide pivot intersecting the axis of the slide means; a first lever carrying the pivot for the straight edge means, a base pivot spaced from the pivot for the straight edge means and mounting the first lever upon the base, a guide lever for the guide pivot and carrying the same, a base pivot mounting the guide lever upon the base and spaced from the guide pivot and from the first base pivot, means for adjusting the angular position of the guide lever on the base pivot, means for adjusting the length of the guide lever, and means connecting the levers together for movement through equal angles and in the same direction.

18. A perspective drawing device as in claim 17 in which the means for connecting the levers together for movement through equal angles is a gear means.

19. A perspective drawing device comprising a base; straight edge means including a pivot having a vertical axis, slide means extending from the pivot and having an axis, means forming a part of the straight edge means having a ruling edge extending at right angles to the slide means and in line with the axis of the pivot for the straight edge means, and a guide pivot having a vertical axis and a guide slidably receiving the slide means with the axis of the guide pivot intersecting the axis of the slide means; a first lever carrying the pivot for the straight edge means for movement in a circle, a first base pivot mounting the lever on the base, a guide lever having a right angular extension carrying the guide pivot for movement in a circle, a second base pivot mounting the guide lever on the base spaced from the first base pivot, a link having spaced pivots spaced apart a distance the same as the distance between the spaced base pivots and pivotally connecting the two levers together for movement through equal angles and in the same direction, and the guide pivot being adjustable along the extension for adjusting the distance between the guide pivot and the pivot for the straight edge means.

20. A perspective drawing device comprising a base; straight edge means including a pivot having a vertical axis, slide means extending from the pivot and having an axis in line with the axis of the pivot for the straight edge means, means forming a part of the straight edge means having a ruling edge extending at right angles to the slide means and in line with the axis of the pivot for the straight edge means, and a pair of guide pivots each having a vertical axis and a guide slidably receiving the slide means with the axis of the guide pivot intersecting the axis of the slide means; a first lever carrying the pivot for the straight edge means, a base pivot spaced from the pivot for the straight edge means and mounting the first lever upon the base, a guide lever for each guide pivot and carrying the same, a base pivot for each guide lever spaced from the guide pivot and equidistantly from the first base pivot on each side thereof, and means connecting the levers together for movement through equal angles and in the same direction.

21. A perspective drawing device comprising a base; straight edge means including a pivot having a vertical axis, slide means extending from the pivot and having an axis in line with the axis of the pivot for the straight edge means, means forming a part of the straight edge means having a ruling edge extending at right angles to the slide means and in line with the axis of the pivot for the straight edge means, and a guide pivot having a vertical axis and a guide slidably receiving the slide means with the axis of the guide pivot intersecting the axis of the slide means; a first lever carrying the pivot for the straight edge means, a pair of spaced base pivots mounted upon the base, a parallelogram pivotally mounted upon the base pivots including a pair of parallel arms and a connecting link therebetween, a guide lever carrying the guide pivot and connected with one of the parallel arms, and the pivot for the straight edge means being carried upon the connecting link.

22. A perspective drawing device as in claim 21 including means for adjusting the angular relation of the guide lever to its parallel arm, and means for adjusting the length of the guide lever.

23. A perspective drawing device comprising a base; straight edge means including a pivot having a vertical axis, slide means extending from the pivot and having an axis, means forming a part of the straight edge means having a ruling edge extending at right angles to the slide means and in line with the axis of the pivot for the straight edge means, and guide pivot means including at least one guide pivot having a vertical axis and a guide slidably receiving the slide means with the axis of the guide pivot intersecting the axis of the slide means; means mounting each guide pivot upon the base for movement in a circle about a fixed axis, means mounting the pivot for the straight edge means upon the base for movement in a circle about a fixed axis spaced from the other fixed axis and connecting the two mounting means for movement together through equal angles and in the same direction, and means for adjusting the distance between each guide pivot and the pivot for the straight edge means over a range greater than and less than the distance between the fixed axes on the base.

References Cited in the file of this patent

UNITED STATES PATENTS 2,484,361    Upton  ---------------- Oct. 11, 1949

FOREIGN PATENTS 410,050    Italy ---------------- Mar. 20, 1945
411,582    Italy ---------------- Feb. 12, 1945
413,337    Italy ---------------- Apr. 10, 1946
48,485    France ---------------- Nov. 29, 1937